United States Patent [19]

Heilgeist

[11] 4,427,503

[45] Jan. 24, 1984

[54] METHOD FOR REDUCING THE ACID CONTENT OF A NITRIC ACID SOLUTION BY USING ELECTROLYSIS CURRENT

[75] Inventor: Michael Heilgeist, Linkenheim, Fed. Rep. of Germany

[73] Assignee: Kernforschungszentrum Karlsruhe GmbH, Karlsruhe, Fed. Rep. of Germany

[21] Appl. No.: 328,668

[22] Filed: Dec. 8, 1981

[30] Foreign Application Priority Data

Dec. 19, 1980 [DE] Fed. Rep. of Germany ....... 3047988

[51] Int. Cl.³ .............................................. C25B 1/00
[52] U.S. Cl. .................................. 204/101; 204/102; 423/351
[58] Field of Search ................ 423/351; 204/101, 102

[56] References Cited

U.S. PATENT DOCUMENTS 1,040,379 10/1912 Moest et al. ........................ 204/102
3,401,098 9/1968 Hersch et al. ....................... 204/101
3,510,412 5/1970 Raviv et al. .......................... 204/101
4,056,482 11/1977 Schmieder et al. .

FOREIGN PATENT DOCUMENTS 2449588 4/1976 Fed. Rep. of Germany .
2041975 1/1980 United Kingdom .

Primary Examiner—R. L. Andrews
Attorney, Agent, or Firm—Spencer & Frank

[57] ABSTRACT

Process for reducing the acid content of a nitric acid solution by using an electrolysis current which is capable of reducing $HNO_3$ at the cathode. The nitric acid solution is divided into a first volume portion and a second volume portion. The first volume portion is reduced electrolytically to form a reaction product containing ammonium nitrite (AN). The second volume portion is reduced electrolytically to form a reaction product in the form of nitrous gases $NO_x$, essentially NO and/or $NO_2$. The reaction products are brought together and reacted at a temperature in the range from 50° C. to below the boiling point of the solution resulting from the bringing together of the reaction products, by heating the resulting solution.

3 Claims, 2 Drawing Figures

METHOD FOR REDUCING THE ACID CONTENT OF A NITRIC ACID SOLUTION BY USING ELECTROLYSIS CURRENT

BACKGROUND OF THE INVENTION

The present invention relates to a method for reducing the acid content of a nitric acid solution by using an electrolysis current capable of reducing $HNO_3$ at the cathode.

In the field of reprocessing irradiated nuclear fuel and/or breeder materials, and in the field of the removal of radioactive wastes, chemical as well as electrochemical processes are known which are used to reduce nitric acid concentrations in aqueous, radioactive waste solutions. It has been proposed, for example, to denitrate aqueous medium active waste solutions (MAW) with the aid of electrical current. See, M. Heilgeist et al, "Reduktion des mittelaktiven Abfalles durch salzfreie Verfahrensschritte" in, Bericht der Kernforschungszentrum Karlsruhe GmbH No. 2940 (March 1980), entitled "Sammlung der Vorträge anlässlich des 3. Statusberichtes des Projektes Wiederaufarbeitung und Abfallbehandlung am 8.11.1979", in translation, "Reduction of medium active waste by means of saltfree process steps," in Report by KFK GmbH No. 2940, March 1980, entitled "Collection of lectures given on the occassion of the third status report for the reprocessing and waste treatment project, on November 8th, 1979", pages 216 to 234. In this proposal, nitric acid is converted at the cathode of an electrolysis cell, by absorbing electrons, into nitrogen compounds in which the nitrogen has a lower valency. The following table shows the range of possible products.

| Cathode Product X | Valency of nitrogen | Current requirement (theoretical) [Ah/Mol $HNO_3$] | Standard-EMK [V] X/$HNO_3$ |
|---|---|---|---|
| $NO_2/N_2O_4$ | +4 | 26.8 | +0.81 |
| $HNO_2$ | +3 | 53.6 | +0.94 |
| NO | +2 | 80.4 | +0.96 |
| $N_2O$ | +1 | 107.2 | +1.11 |
| $H_2N_2O_2$ | +1 | 107.2 | +0.9 |
| $N_2$ | 0 | 134 | +1.24 |
| $NH_3OH^+$ | −1 | 160.8 | +0.72 |
| $N_2H_5^+$ | −2 | 187.6 | +0.82 |
| $NH_4^+$ | −3 | 214.4 | +0.88 |

X = reduction product
Standard-EMK = electromotoric Force (emf)
Ah = Ampere hours
V = Volt
(V) X/$HNO_3$: means the voltage value of the emf of the half-cell reaction $HNO_3$ + n·e = X (the reduction product of $HNO_3$, see first column of table) combined with the Standard Hydrogen Electrode: $2H^+ + 2 \cdot e = H_2$.

Whether the above-listed products result, which of the above-listed products result and to which extent the above-listed products result, depends on a number of factors including the potential of the cathode, the electrode material, the presence of possibly existing catalysts, the electrolyte concentration and the cell structure. Titanium and graphite have been found to be suitable cathode materials, based on their electrochemical suitability for nitric acid reduction as well as because of their low corrosion rates. Electrochemical nitric acid reduction at graphite cathodes leads, selectively, to NO or ammonia or ammonium ions, respectively. For NO production, a relatively low limit of current density was observed, which limited the conversion. For $NH_3$ as the product, much higher current densities are required.

The drawbacks of these processes are that, on the one hand, nitrous gases are produced which must be removed in further process steps and, on the other hand, $NH_3$ is formed which is bound in the nitric acid solution to ammonium nitrate $NH_4NO_3$ (hereinafter referred to as AN). The AN must also be removed since it interferes with the further processing of the waste solution containing the AN to a solid product fit for permanent storage.

SUMMARY OF THE INVENTION

It is an object of the present invention to provide a process with which it is possible to reduce the acid content of a nitric acid solution, in a radioactive form as well as in an inactive form, in a continuous process (or in a discontinuous process) with the formation of nontoxic, gaseous decomposition products of nitric acid.

A further object of the present invention is to provide apparatus for performing the process.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for reducing the acid content of a nitric acid solution by using an electrolysis current which is capable of reducing $HNO_3$ at the cathode, comprising: (a) dividing the nitric acid solution into a first volume portion and a second volume portion; (b) reducing the first volume portion electrolytically to form a reaction product containing ammonium nitrate (AN); (c) reducing the second volume portion electrolytically to form a reaction product in the form of nitrous gases $NO_x$, essentially NO and/or $NO_2$; and (d) bringing together the reaction products from step (b) and from step (c) and permitting them to react at a temperature in the range from 50° C. to below the boiling point of the solution resulting from the bringing together of the reaction products, by heating the resulting solution.

It is understood that both the foregoing general description and the following detailed description are exemplary, but are not restrictive of the invention.

DETAILED DESCRIPTION OF THE INVENTION

In one preferred embodiment of the process according to the present invention, the first volume portion of the nitric acid solution is reduced in a first electrolysis cell to obtain an AN solution, the second volume portion of the nitric acid solution is reduced in a second electrolysis cell to obtain a gas containing NO and/or $NO_2$ which is discharged from the second cell, the AN solution and the discharged gas are conducted in countercurrent through a tubular reactor which is filled with Raschig rings and heated through a thermostat jacket, and the AN solution and discharged gas are reacted in the tubular reactor at a temperature in the range between 50° C. and 100° C. The electrolytic reductions in the first and second cells can be conducted in accordance with well known techniques.

In a second advantageous embodiment of the process of the present invention, the first volume portion of the nitric acid solution is reduced at a first cathode, the second volume portion of the nitric acid solution is reduced at a second cathode, the first and second cathodes being in a common electrolysis cell having a single anode which is separated from the cathodes by means of a diaphragm, and the solution (electrolyte) in the cell is heated during the electrolytic reduction to a temperature in the range between 50° and 100° C.

The second embodiment of the process is implemented according to present invention in an apparatus which comprises an electrolysis cell which is equipped with two cathodes and an anode which is separated from the two cathodes by a diaphragm.

Figure 2:
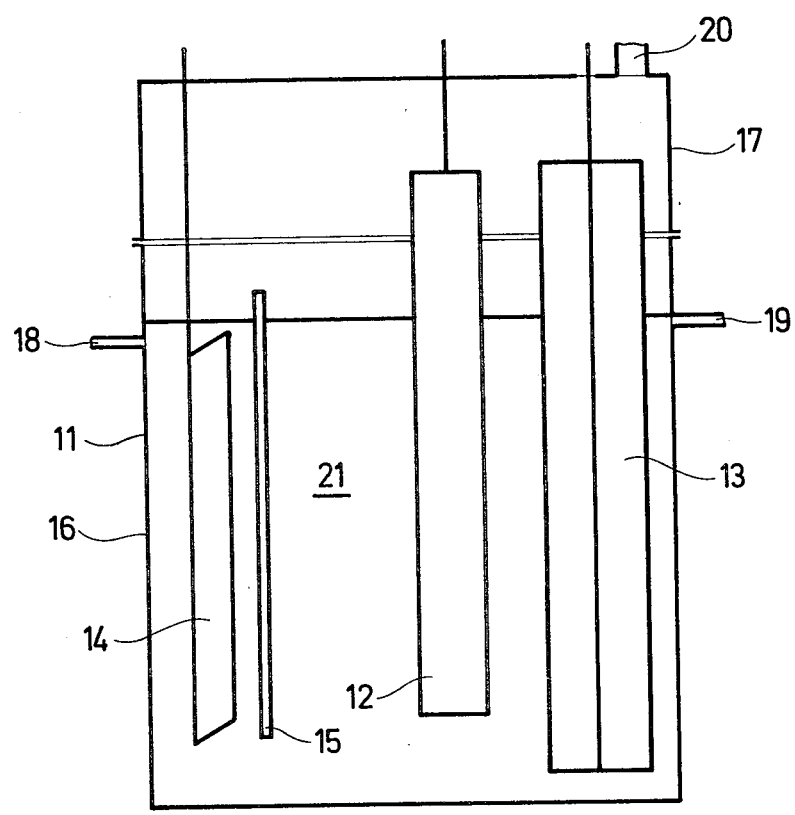
FIG. 2 shows apparatus in accordance with the present invention for performing a second embodiment of the process according to the present invention.

An advantageous embodiment of the apparatus according to the present invention, as shown in FIG. 2, comprises a first cathode 12 made of a graphite rod, a second cathode 13 formed of a bed of bulk graphite grains, an anode 14 made of platinum or platinized tantallum, and a diaphram 15 made of a glass frit body or of a porous ceramic body.

The reaction between the nitrous gases formed by the second volume portion and the ammonium nitrate formed by first volume portion results intermediarily in ammonium nitrite $NH_4NO_2$ which decomposes at the increased temperature of the solution according to the following equation:

$$NH_4NO_2 = N_2 + 2H_2O$$

The advantages of the process according to the invention are that an easily controllable continuous process sequence is assured and that nontoxic gases $N_2$ and $N_2O$ form as denitration products.

The mol ratios of AN and $NO_x$ should lie preferably in the range $AN:NO_x=1:1$ to $AN:NO_x=1:4$ in the reaction vessel. Accordingly the production rates for AN and $NO_x$ will have to lie within these ranges.

The current densities at the cathode determine the cathode potentials. For low current densities a potential range is achieved, where it is possible to reduce nitric acid to $NO_x$. The current densities which are preferred for this case lie in the range 0.1 to 20 $mA/cm^2$.

For high current densities at the resulting potentials the reduction of nitric acid to ammonia is possible. The range for the current densities lies here between 50 and 1000 $mA/cm^2$.

For the first preferred embodiment of the process the dividing of the two portions depends on several factors. The current which is used fixes the production rate of $NO_x$ and ammonia. For a given production ratio of $NO_x$ and ammonia the volume which is needed in each case depends on the amount of depletion of the nitric acid in the two volumes.

For the same amount of depletion of nitric acid, the same current and a 100%-yield of each product in the $NO_x$- and the $NH_3/NH_4^+$-production cell, the ratio of the volume portions for the $NO_x$-production cell and for the $NH_3/NH_4^+$-production cell would have a value of 1.33:1, the resulting product ratio being 2.66:1 for $NO_x:NH_4^+$.

Because of the desired continuous reaction in the tubular reactor the flow of the nitric acid solution through the $NH_3/NH_4^+$-production cell and furtheron to the tubular reactor has to be continuous. On the other hand in the $NO_x$-production cell only the $NO_x$-production has to be continuous.

That means, the way in which the nitric acid is depleted in the $NO_x$-production cell, or the type of reactor which is used, can be in the form of a continuous, a semicontinuous or a batch type.

For the last two ways the dividing in the two volume portions considers time and flowrate for the $NH_3/NH_4^+$-production cell and the batch volume for the $NO_x$-production cell for a given reaction time.

For the second advantageous embodiment the dividing of the two volume portions takes place by means of the different current densities, resulting in different cathode potentials, which lead to $NH_3/NH_4^+$ as a reduction product of nitric acid at the cathode with high current density (50 to 1000 $mA/cm^2$) and to $NO_x$ as a reduction product at the cathode with low current density (0.1 to 20 $mA/cm^2$).

For a given current density the amount of the produced moles can be changed by changing the cathode area and the current.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

This example illustrates producing $NH_4^+/NH_3$ in a first electrolysis cell and the production of $NO_x$ in a second separate electrolysis cell, and then combining the product streams from the two cells in a reactor.

Figure 1:
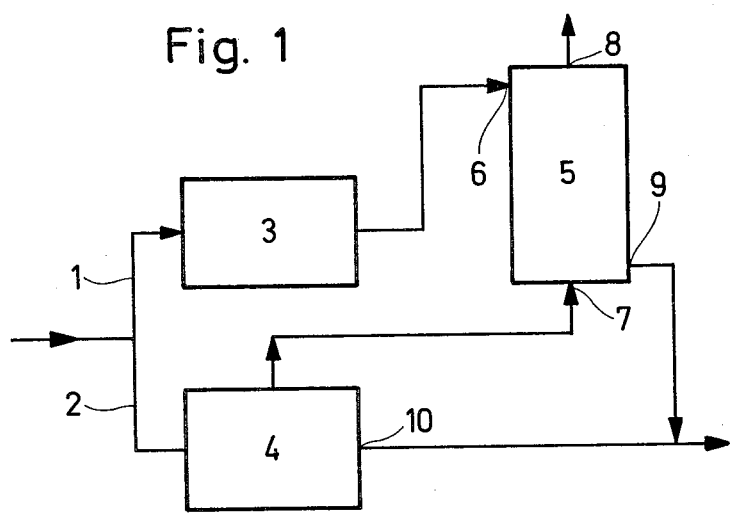
FIG. 1 shows apparatus for performing one embodiment of the process of the present invention.

FIG. 1 shows a process scheme according to which a nitric acid electrolyte is divided into a partial stream 1 and a partial stream 2, whereupon the partial stream 1 flows through an $NH_3/NH_4^+$ production cell 3, and the partial stream 2 flows through an $NO_x$ production cell 4. The partial stream 1 which flows into production cell 3 is subjected to a reduction process to form a denitration product in the form of an $NH_4NO_3$ solution containing a small content of $HNO_3$. The denitration product from production cell 3 in the form of the $NH_4NO_3$ solution is fed at an entry point 6 to an $NH_4^+$-$NO_x$ reactor 5.

The partial stream 2 which flows into $NO_x$ production cell 4 is subjected to a reduction process to form nitrous gas, $NO_x$, and a denitrated solution. The $NO_x$ gas from $NO_x$ production cell 4 is introduced at point 7 of reactor 5. The reaction products $N_2$ and $N_2O$ leave reactor 5 at point 8 as nontoxic waste gases. A denitrated solution is extracted at point 9 of reactor 5, and the correspondingly denitrated solution from $NO_x$ production cell 4 is extracted at point 10. The denitrated solutions from $NO_x$ production cell 4 and reactor 5 are then further treated together.

In a particular process example, the ammonium nitrate (AN) production cell 3 was fed with a partial stream 1 which was a MAW simulate, and which contained 2.7 Mol/l $HNO_3$, 1.3 Mol/l $NaNO_3$, and 10 mg/l $Cu^{2+}$ ions as catalyst ions. ($Cu^{2+}$ also stands for the composition of the metal ions in the MAW, which also has a catalytic effect.) The flow Q of nitric acid solution through cell 3 was 0.125 l/h. Cell 3 was operated with a current I equal to 50 amperes and a cathode current density of 88 $mA/cm^2$. The cell structure of cell 3 was of the flow-through cell type, containing a graphite cathode and housing, with a cathode area of 568 cm$^2$. The anode was a platinum plated tantalum electrode having an area of 1890 cm$^2$. The denitration product leaving cell 3 was an AN containing solution containing 1.1 Mol/l AN and 0.1 Mol/l HNO$_3$. The conversion in cell 3 was 0.14 Mol/h AN. The yield with respect to NH$_4^+$/NH$_3$ was equal to 60%. Operation time 14 hours.

The NO$_x$ production cell 4 was fed with a partial stream 2 which served as electrolyte and contained 2.7 Mol/l HNO$_3$, 1.3 Mol/l NaNO$_3$, and 10 mg/l Cu$^{2+}$ ions. (Catalysts or cations of MAW which serve as catalysts for NH$_3$/NH$_4^+$-production do not interfere with the process). The partial stream 2 was first collected in a separate vessel to a volume of 3 liters. This volume was cycled with a pump through cell 4 with a flow rate of 20 l/h until the wanted depletion of nitric acid was reached.

This was done because of feasibility reasons in the lab and demonstrates a semicontinuous depletion process for the nitric acid and a continuous NO$_x$-production process (therefore the separate vessel and the pump are not shown in FIG. 1). The current I in cell 4 was 54 amperes, and the average cathode current density was 20 mA/cm$^2$. The cell structure of cell 4 was of the flow-through cell type. The cathode of cell 4 was in the form of a bed of bulk graphite grains, with the depth of the bed being 2 cm. Cell 4 contained a diaphragm which was made of a porous ceramic, and an anode which was made of platinum plated tantalum. The NO$_x$ production rate in cell 4 was 0.5 Mol/h NO and there was a residual HNO$_3$ content of about 0.1 Mol/l in the denitrated solution leaving cell 4 at point 10 at the end of the reaction time of 14 hours. The current yield in cell 4 was about 75%. The resulting ratios of the volume portions for the NO$_x$-production cell and for the NH$_3$/NH$_4^+$-production cell being 1.7:1.

The NH$_4^+$-NO$_x$ reactor 5 was a tubular reactor of a volume of 200 ml filled with Raschig rings, and was continuously traversed from the top by the product stream of the AN cell 3, while the cathode gas product from the NO$_x$ cell 4 charged the tubular reactor from the bottom. The reaction temperature in reactor 5 was 90° C. Reactor 5 was heated through a thermostat jacket. The reaction products of reactor 5 were an electrolyte and an exhaust gas. The electrolyte was in the form of a solution containing 0.3 Mol/l AN and 0.4 Mol/l HNO$_3$, with an AN conversion equal to 73%. Analysis of the exhaust gas showed that there was a NO consumption of 0.35 Mol/h and a conversion of 70%. The reaction products in the exhaust gas were determined to be N$_2$ an N$_2$O at a ratio of 4:1. The given values for the NH$_4^+$-NO$_x$ reactor, the NO$_x$-production cell and NH$_3$/NH$_4^+$-production cell are steady state values after 14 hours of operation.

EXAMPLE 2

This example illustrates the production of AN and NO$_x$ in a common electrolysis cell, as shown schematically in FIG. 2.

Electrolysis cell 11 comprises a ceramic cell body 16 and a covering hood 17, as well as two cathodes 12 and 13, an anode 14 and a diaphragm 15. AN is produced at high current density at cathode 12 (i≧50 mA/cm$^2$), and NO$_x$ is produced with low current density at cathode 13 (i≦20 mA/cm$^2$), the current densities being controlled in such a manner that the defined potentials across the cathodes remain essentially constant. The nitric acid containing solution to be treated is introduced into electrolysis cell 11 through an inlet opening 18, and the denitrated solution is extracted at an outlet opening 19. Exhaust gas is extracted through an exhaust gas opening 20 in covering hood 17 and is conducted away. The common anode 14 may be a platinum plated metal with valve properties, such as, for example, titanium, niobium or tantalum, etc.

In a particular process example, the electrolyte 21 in cell 11 was a nitric acid solution containing 1.5 M HNO$_3$ and 10 mg/l Cu$^{2+}$. The flow Q of electrolyte through cell 11 was 0.1 l/h. The cell structure of cell 11 was of flow-through cell type. The cell body 16 was made of a ceramic and anode 14 was made of platinum plated tantallum. The AN producing cathode 12 was made of graphite rod having an area of 67 cm$^2$. The current I with respect to cathode 12 was 10 amperes (i=149 mA/cm$^2$). The NO$_x$ producing cathode 13 was made of a bed of bulk graphite grains. The current I with respect to cathode 13 was 10 amperes. Cathode 13 had a bulk bed depth of 2 cm and an average current density 20 mA/cm$^2$.

Diaphragm 15, consisting of a glass frit or a porous ceramic body, was disposed between anode 14 and cathodes 12 and 13, to prevent reoxidation of NO$_x$ and HNO$_2$ at anode 14.

The total current in cell 11 was 20 amperes. The electrolyte in cell 11 was maintained at a reaction temperature of 90° C. The reaction product in the form of a denitrated solution at cell outlet 19 in equilibrium after 8 hours contained 0.12 Mol/l HNO$_3$ and 0.15 Mol/l NH$_4$NO$_3$, with a resulting conversion for HNO$_3$ equal to 92%.

The exhaust gas at cell outlet 20 had the following composition:

| Waste Gas Composition | O$_2$ | NO$_2$ | NO | H$_2$ | N$_2$ | N$_2$O |
|---|---|---|---|---|---|---|
| l/h | 3.8 | 0.7 | 0.1 | 3.1 | 0.48 | 0.11 |

It will be understood that the above description of the present invention is susceptible to various modifications, changes, and adaptations, and the same are intended to be comprehended within the meaning and range of equivalents of the appended claims.

What is claimed is:

1. Process for reducing the acid content of a nitric acid solution by using an electrolysis current which is capable of reducing HNO$_3$ at the cathode, comprising
   (a) dividing the nitric acid solution into a first volume portion and a second volume portion;
   (b) reducing the first volume portion electrolytically to form a reaction product containing ammonium nitrate (AN);
   (c) reducing the second volume portion electrolytically to form a reaction product in the form of nitrous gases NO$_x$, essentially NO and/or NO$_2$; and
   (d) bringing together the reaction products from step (b) and from step (c), and reacting them at a temperature in the range from 50° C. to below the boiling point of the solution resulting from the bringing together of the reaction products by heating the resulting solution.

2. Process as defined in claim 1, wherein the first volume portion of the nitric acid solution is reduced in a first electrolysis cell to obtain an AN solution; the second volume portion of the nitric acid solution is reduced in a second electrolysis cell to obtain a gas containing NO and/or $NO_2$, which is discharged from the second cell, the AN solution and discharged gas are conducted in countercurrent through a tubular reactor, which is filled with Raschig rings and heated through a thermostat jacket, and the AN solution and discharged gas in the tubular reactor are reacted at a temperature in the range between 50° C. and 100° C.

3. Process as defined in claim 1, wherein the first volume portion of the nitric acid solution is reduced at a first cathode, the second volume portion of the nitric acid solution is reduced at a second cathode, the first and second cathodes being in a common electrolysis cell having a single anode which is separated from the cathodes by a diaphragm, and the solution in the cell is heated during the electrolytic reduction to a temperature in the range between 50° C. and 100° C.

* * * * *